US012017210B2

(12) United States Patent
Kim et al.

(10) Patent No.: US 12,017,210 B2
(45) Date of Patent: Jun. 25, 2024

(54) CONTACTLESS, DAMAGE-FREE, HIGH-PRECISION CELL EXTRACTION AND TRANSFER THROUGH ACOUSTIC DROPLET EJECTION

(71) Applicant: UNIVERSITY OF SOUTHERN CALIFORNIA, Los Angeles, CA (US)

(72) Inventors: Eun Sok Kim, Rancho Palos Verdes, CA (US); Yongkui Tang, Pasadena, CA (US); Xuelian Chen, Alhambra, CA (US); Jiang F. Zhong, Temple City, CA (US)

(73) Assignee: University of Southern California, Los Angeles, CA (US)

(*) Notice: Subject to any disclaimer, the term of this patent is extended or adjusted under 35 U.S.C. 154(b) by 496 days.

(21) Appl. No.: 17/327,431

(22) Filed: May 21, 2021

(65) Prior Publication Data

US 2021/0362145 A1 Nov. 25, 2021

Related U.S. Application Data

(60) Provisional application No. 63/028,755, filed on May 22, 2020.

(51) Int. Cl.
*G01N 33/68* (2006.01)
*A01N 1/02* (2006.01)
(Continued)

(52) U.S. Cl.
CPC .......... *B01L 3/0268* (2013.01); *B06B 1/0696* (2013.01); *B01L 2400/0436* (2013.01); *B01L 2400/0439* (2013.01)

(58) Field of Classification Search
CPC ........... B01L 3/0268; B01L 2400/0436; B01L 2400/0439; B01L 2300/0809; B06B 1/0696; B06B 1/0651
See application file for complete search history.

(56) References Cited

U.S. PATENT DOCUMENTS

| | | | | |
|---|---|---|---|---|
| 7,719,170 B1 * | 5/2010 | Kim | H10N 30/06 310/335 |
| 2002/0064809 A1 * | 5/2002 | Mutz | G01N 35/1074 435/40.5 |
| 2021/0039128 A1 * | 2/2021 | Bowen | B41J 2/04596 |

OTHER PUBLICATIONS

Tang, Yongkui, et al. "On-demand, heatless ejection of sub-MM-sized liquid droplets." 2017 IEEE 30th International Conference on Micro Electro Mechanical Systems (MEMS). IEEE, 2017. (Year: 2017).*

(Continued)

*Primary Examiner* — Jennifer Wecker
*Assistant Examiner* — Oyeleye Alexander Alabi
(74) *Attorney, Agent, or Firm* — Brooks Kushman P.C.

(57) ABSTRACT

A device for contactless, damage-free, high-precision cell and/or particle extraction and transfer through acoustic droplet ejection includes a substrate having a first surface and a second surface and a focused ultrasonic transducer positioned to focus an acoustic wave onto the substrate such that a droplet that includes at least one cell or particle is ejected from the bulk or from the first surface per each actuation of the focused ultrasonic transducer through droplet ejection. The substrate includes cells or particles inside the substrate or on top of the substrate. The focused ultrasonic transducer includes a piezoelectric substrate having a top face and a bottom face, a Fresnel acoustic lens including a plurality of annular rings of air cavities disposed on the top face, and a first patterned circular electrode disposed over the top face and a second patterned circular electrode disposed over the bottom face. The first patterned circular electrode overlaps the second patterned circular electrode.

24 Claims, 14 Drawing Sheets
(6 of 14 Drawing Sheet(s) Filed in Color)

(51) Int. Cl.

| | |
|---|---|
| ***B01L 3/00*** | (2006.01) |
| ***B01L 3/02*** | (2006.01) |
| ***B06B 1/06*** | (2006.01) |
| ***C07C 309/65*** | (2006.01) |
| ***C07C 309/73*** | (2006.01) |
| ***F04B 43/12*** | (2006.01) |
| ***G01N 1/40*** | (2006.01) |
| ***G01N 21/33*** | (2006.01) |
| ***G01N 21/64*** | (2006.01) |
| ***G01N 33/52*** | (2006.01) |
| ***G01N 35/10*** | (2006.01) |

(56) References Cited

OTHER PUBLICATIONS

Tang, Yongkui, and Eun Sok Kim. "Electrical tuning of focal size with single focused ultrasonic transducer." 2018 IEEE International Ultrasonics Symposium (IUS). IEEE, 2018. (Year: 2018).*

Lee, Chuang-Yuan, Hongyu Yu, and Eun Sok Kim. "Acoustic ejector with novel lens employing air-reflectors." 19th IEEE International Conference on Micro Electro Mechanical Systems. IEEE, 2006. (Year: 2006).*

Lee, H. et al, "Acoustic Ejector with Novel Lens Employing Air-Reflectors,", The 19th IEEE International Micro Electro Mechanical Systems Conference, Istanbul (MEMS 2006), Turkey, Jan. 22-26, 2006, pp. 170-173.

Tang, Y. et al., "On-Demand, Heatless Ejection of Sub-Millimeter-Sized Liquid Droplets," The 30th IEEE International Conference on Micro Electro Mechanical Systems (MEMS 2017), Las Vegas, NV, USA, Jan. 22-26, 2017, pp. 1196-1199.

Tang, Y. et al., "Electrical Tuning of Focal Size with Single Focused Ultrasonic Transducer," IEEE International Ultrasonics Symposium (IUS 2018), Kobe, Japan, Oct. 22-25, 2018, pp. 1-4.

* cited by examiner

CONTACTLESS, DAMAGE-FREE, HIGH-PRECISION CELL EXTRACTION AND TRANSFER THROUGH ACOUSTIC DROPLET EJECTION

CROSS-REFERENCE TO RELATED APPLICATIONS

This application claims the benefit of U.S. provisional application Ser. No. 63/028,755 filed May 22, 2020, the disclosure of which is hereby incorporated in its entirety by reference herein.

STATEMENT REGARDING FEDERALLY SPONSORED RESEARCH OR DEVELOPMENT

The invention was made with Government support under Contract Nos. 1R01 EB026284 and 1R01 CA197903 awarded by the National Institutes of Health (NIH). The Government has certain rights to the invention.

TECHNICAL FIELD

In at least one aspect, a device for extracting and/or transfer cells contactlessly using ultrasonic waves to eject droplets containing one or more cells.

BACKGROUND

There is an unmet need to extract cell(s) from mono-layer cells cultured on a solid surface for regenerative medicine. When using a pipette, scoop, or knife, it is difficult to control the number of cells extracted due to large tool size and poor precision and repeatability of the manual operation. Micromanipulation offers better precision and is suitable for rare cells, but with low throughput [1]. Laser capture microdissection (LCM) has higher throughput but is still time-consuming [2], and requires a complicated and expensive system. Moreover, all the methods mentioned above may cause unwanted damage on the extracted cells and on the extraction edges of remaining cells, resulting in loss of rare cells, scars on the tissue grown out of the cells, or contamination from accidentally damaged neighboring cells.

A focused ultrasound (FUS) offers a solution to this need, as it can produce large, yet undamaging, focused extraction force which can eject cells contained in liquid droplets with minimal impact on the cells. Ultrasound propagates through different types of liquids and solids (without much reflection at the interfaces of materials with similar acoustic impedances), and the FUS transducer does not have to be in physical contact with the substrate where cells are grown. The number of cells that are ejected by a FUS transducer depends on the focal size of the FUS, which can be very small (as small as the size of a single cell) and is very precise and repeatable.

SUMMARY

In at least one aspect, an SFAT device for contactless, damage-free, high-precision cell and/or particle extraction and transfer through acoustic droplet ejection includes a substrate having a first surface and a second surface, and a focused ultrasonic transducer positioned to focus an acoustic wave onto the substrate such that a droplet that includes at least one cell or particle is ejected from the bulk or from the first surface per each actuation of the focused ultrasonic transducer through droplet ejection. The substrate having cells or particles inside the substrate or on top of the substrate. The focused ultrasonic transducer includes a piezoelectric substrate having a top face and a bottom face, a Fresnel acoustic lens including a plurality of annular rings of air cavities disposed on the top face, and a first patterned circular electrode disposed over the top face and a second patterned circular electrode disposed over the bottom face. The first patterned circular electrode overlaps the second patterned circular electrode.

In another aspect, FUS-based ejection of particles (to simulate cells) from a solid surface with the FUS transducer not in direct contact with the particle-containing solid substrate is provided. Specifically, self-focusing acoustic transducers (SFATs) based on Fresnel air-cavity lens [3] is used. The SFAT allows different amounts of microspheres to be ejected out of the surface of a Petri dish filled with agarose gel through varying the focal size of SFAT. Cells grown on a Petri dish can are demonstrated to be ejected from a monolayer of cells without damaging surrounding cells. For these experiments, SFATs have been designed to operate at different frequencies and used multiple SFATs with different focal sizes. However, with a special design, the focal size of a single SFAT can be electrically tuned [4].

In another aspect, a single-element planar focused ultrasound transducer is designed to focus the ultrasound through liquid, gel, and solid media, such as phosphate-buffered saline (PBS), agarose gel, and polystyrene Petri dish, to produce droplets containing particles and/or cells from near liquid-air interface.

In another aspect, nozzleless, heatless and contact-free droplet ejection from the near liquid-air interface is achieved by focused ultrasound to extract live cells or particles without any damage to the ejected cells or particles as well as the remaining cells or particles.

In another aspect, precise and repeatable control of the extracted amount of cells or particles is achieved through precise and repeatable control of the ejected droplet size as the operating frequency and/or driving pulse width are varied, or the number of the actuated rings are electrically selected.

In another aspect, a single cell extraction capability is achieved by operating the transducer at a high frequency for a small focal size.

In another aspect, high throughput cell extraction is achieved through an array of the transducers, which can be parallelly-microfabricated in the same batch.

In still another aspect, a method for extracting and transferring monolayer cells cultured on polystyrene Petri dish or any other solid substrate is provided. With a self-focusing acoustic transducer (SFAT), high-intensity focused ultrasound is generated at the liquid-air interface above but close to the cells immersed or floating in cell culture medium, inducing non-damaging extraction force strong enough to detach the cells from the culture medium and eject droplets carrying the cells into air. As a proof-of-concept demonstration, cell-emulating particles (10-μm-diameter polystyrene microspheres) have been ejected through and from agarose-gel-filled Petri dish with high-intensity focused-ultrasound generated from SFATs working on the 3rd, 5th and 9th harmonic resonant frequencies of 1-mm-thick PZT-5A (lead zirconate titanate 5A) sheets. The number of particles per ejection depends on the focal size, which can precisely be controlled. Using an SFAT working on the 9th harmonic resonant frequency of 1-mm-thick PZT-4 substrate, human RPE (retinal pigment epithelium) cells have been successfully ejected from a monolayer of cells cultured on a Petri dish, with minimal impact to cells at the edge of the ejection site. Due to the damage-free ejection, the RPE cells are able to proliferate and fill in the vacancy on the ejection spot without any scar after four days of re-culturing.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a further understanding of the nature, objects, and advantages of the present disclosure, reference should be made to the following detailed description, read in conjunction with the following drawings, wherein like reference numerals denote like elements and wherein.

DETAILED DESCRIPTION

Figure 1:
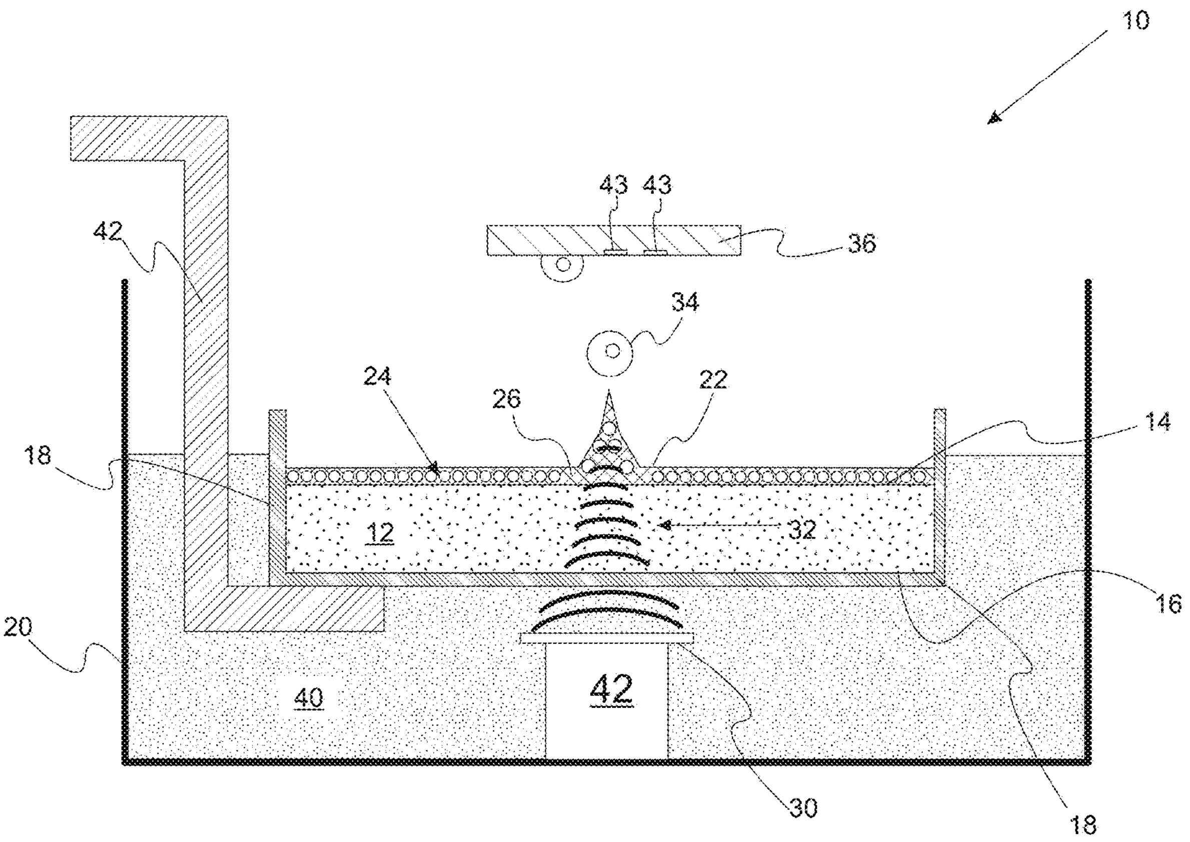
FIG. 1. Cross-sectional diagram of the droplet-assisted particle ejection through a single water droplet per pulse from an agarose-gel-filled Petri dish.

Reference will now be made in detail to presently preferred embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

In the examples set forth herein, concentrations, temperature, frequencies, and device parameters can be practiced with plus or minus 50 percent of the values indicated rounded to or truncated to two significant figures of the value provided in the examples. In a refinement, concentrations, temperature, frequencies, and device parameters can be practiced with plus or minus 30 percent of the values indicated rounded to or truncated to two significant figures of the value provided in the examples. In another refinement, concentrations, temperature, frequencies, and device parameters can be practiced with plus or minus 10 percent of the values indicated rounded to or truncated to two significant figures of the value provided in the examples.

For any device described herein, linear dimensions and angles can be constructed with plus or minus 50 percent of the values indicated rounded to or truncated to two significant figures of the value provided in the examples. In a refinement, linear dimensions and angles can be constructed with plus or minus 30 percent of the values indicated rounded to or truncated to two significant figures of the value provided in the examples. In another refinement, linear dimensions and angles can be constructed with plus or minus 10 percent of the values indicated rounded to or truncated to two significant figures of the value provided in the examples.

The term “one or more” means “at least one” and the term “at least one” means “one or more.” The terms “one or more” and “at least one” include “plurality” as a subset.

The term “substantially,” “generally,” or “about” may be used herein to describe disclosed or claimed embodiments. The term “substantially” may modify a value or relative characteristic disclosed or claimed in the present disclosure. In such instances, “substantially” may signify that the value or relative characteristic it modifies is within ±0%, 0.1%, 0.5%, 1%, 2%, 3%, 4%, 5% or 10% of the value or relative characteristic.

It should be appreciated that in any figures for electronic devices, a series of electronic components connected by lines (e.g., wires) indicates that such electronic components are in electrical communication with each other. Moreover, when lines directed connect one electronic component to another, these electronic components can be connected to each other as defined above.

Throughout this application, where publications are referenced, the disclosures of these publications in their entireties are hereby incorporated by reference into this application to more fully describe the state of the art to which this invention pertains.

Abbreviations:

“FUS” means a focused ultrasound.

“LCM” means laser capture microdissection.

“PBS” means phosphate-buffered saline.

“PZT” means lead zirconate titanate.

“SFAT” means self-focusing acoustic transducer.

“RPE” means retinal pigment epithelium.

With reference to FIG. 1, a device for contactless, damage-free, high-precision cell extraction and transfer through acoustic droplet ejection is provided. In a refinement, the device can be used as a set-up for ejection experiments using contactless, damage-free, high-precision cell extraction and transfer through acoustic droplet ejection. Ejector device 10 includes a substrate 12 having a first surface 14 and a second surface 16. Typically, substrate 12 is a cell culture medium (e.g., PBS solution) or a gel such as an agarose gel. Therefore, the substrate may be held in a first container 18 (e.g., a Petri dish) which is placed inside a second container 20 (e.g., a beaker). The first surface 14 is more proximate to an air interface 22 than the second surface 16. Characteristically, substrate 12 has cells or particles 24 dispersed therein or as a layer on top of substrate 12. In the refinement depicted in FIG. 1, a layer of cells 24 is disposed over the first surface 14. In a refinement, a layer of liquid is disposed over the first surface 14 to form an air interface 22 through which droplets are ejected. For example, a layer of water (or PBS solution) 26 is disposed over the first surface 14 to form the air interface 22. In a refinement, substrate 12 is positioned directly over the focused ultrasonic transducer.

Focused ultrasonic transducer 30 produces sound waves 32 that pass through substrate 12 (e.g., an agarose gel or cell culture medium) in the first container 18 (e.g., a Petri dish). Characteristically, focused ultrasonic transducer 30 ejects through the substrate (e.g., cell culture medium or a gel such as an agarose gel). In a refinement, focused ultrasonic transducer 30 is positioned to focus acoustic wave 32 onto the substrate such that a droplet 34 that includes at least one cell or particle is ejected from the bulk or from the first surface of the substrate per each actuation of focused ultrasonic transducer 30 through droplet ejection. In a refinement, each droplet 34 formed by droplet ejection includes a single cell or a plurality of cells or a single particle or a plurality of particles. Characteristically, focused acoustic wave 32 is focused at a focal zone at focal length F, which can be from 0.5 mm to 40 mm. In a refinement, a collection plate 36 can be used to collect the ejected droplets 34. In a refinement, second container 20 can be used to hold the substrate 12 and focused ultrasonic transducer 30, without the first container 18, so that the substrate 12 is in direct contact with the focused ultrasonic transducer 30. In a further refinement, second container 20 can also be filled with a fluid 40 such as water. Moveable stage 42 can be used to hold and position first container 18 (e.g., a Petri dish).

In a variation, collection device 10 includes a plurality of collection plates 36 for collecting a plurality of ejected droplets either from a single focused ultrasonic transducer or a plurality of focused ultrasonic transducers. In a refinement, a plurality of collecting sites or wells 43 in a collection plate collect a plurality of ejected droplets at a plurality of different collecting sites or wells.

In a variation, the focused ultrasonic transducer 30 is configured to operate at a plurality of different frequencies.

In another variation, the ejector device 10 includes a plurality of focused ultrasonic transducers 30 configured to operate at different focal lengths or different frequencies.

Figure 2A:
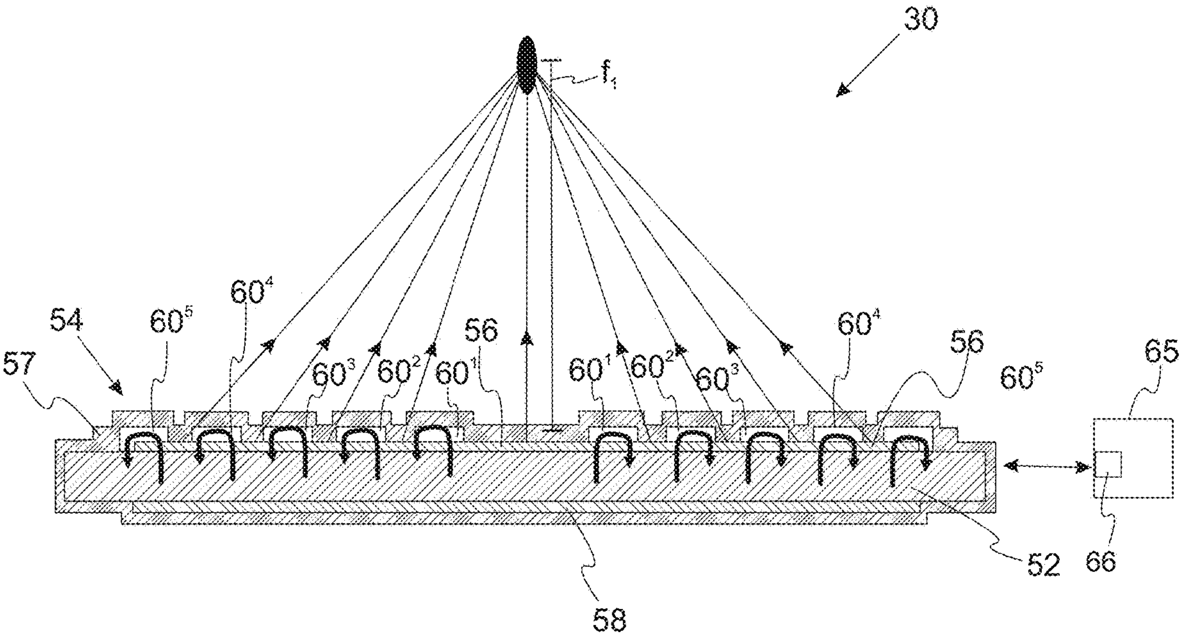
FIG. 2A. Schematic of a Self-focusing Acoustic Transducer (SFAT) used in the ejection experiment of FIG. 1A.
Figure 2B:
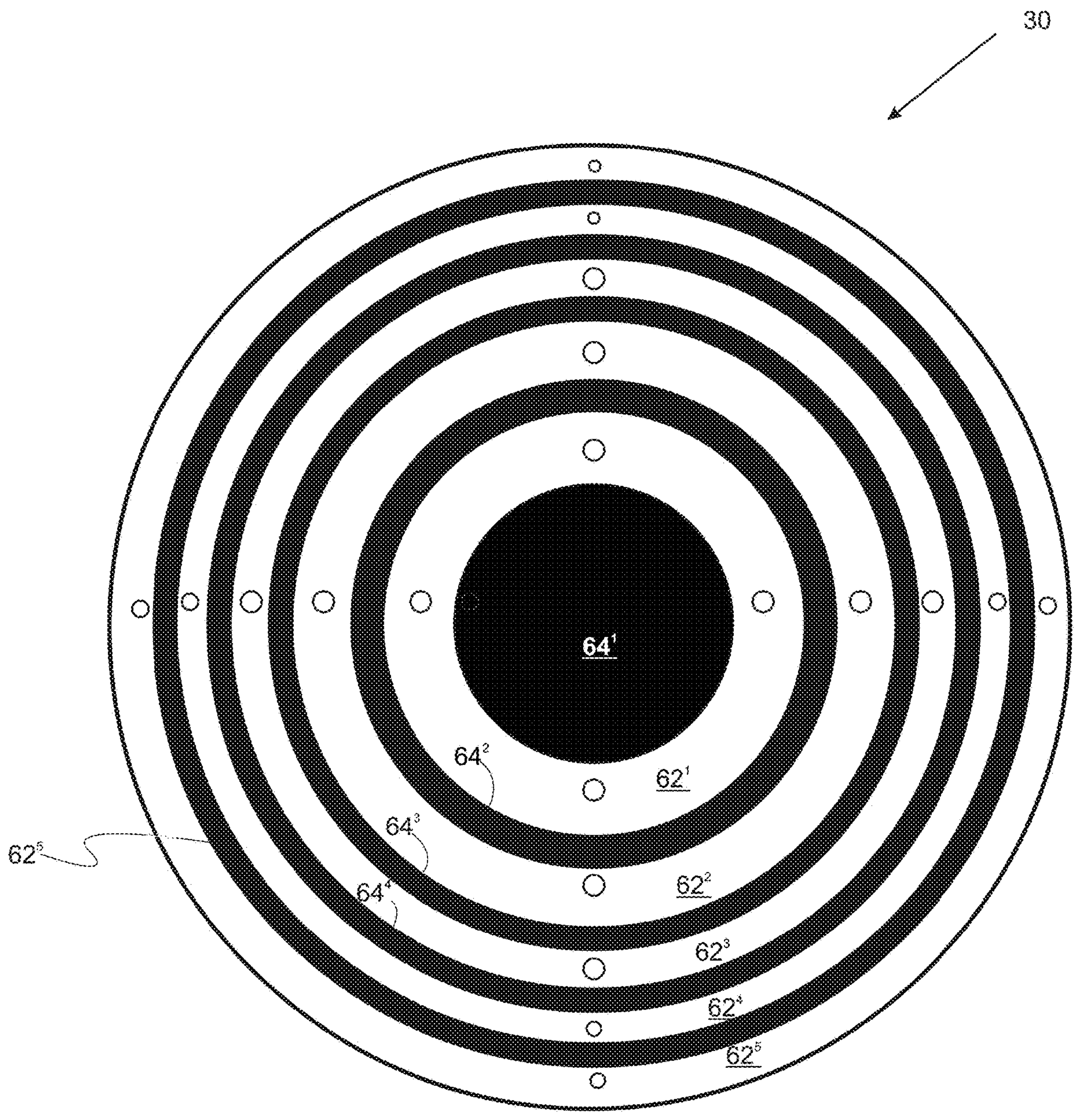
FIG. 2B. Top view of the Self-focusing Acoustic Transducer of FIG. 2A.

With reference to FIGS. 2A and 2B, focused ultrasonic transducer 30 includes piezoelectric substrate 52 having a top face and a bottom face. An example of a useful piezoelectric substrate is lead zirconate titanate. Typically, the piezoelectric substrate has an ultrasonic fundamental thickness-mode resonant frequency (e.g., from about 1 to 180 MHz). Fresnel acoustic lens 54 includes a first metal layer 56 disposed over the top face of piezoelectric substrate 52. Similarly, a second metal layer 58 is disposed over the bottom face of piezoelectric substrate 52. First metal layer 56 defines a first patterned circular electrode while second metal layer 58 defines a second patterned circular electrode. Each of the first metal layer 56 and second metal layer 58 are composed of a metal such as nickel. Characteristically, the first circular electrode overlaps the second circular electrode.

A plurality of annular rings of air cavities 60' are disposed over the top face of piezoelectric substrate 52 and over the first metal layer 56 where i is an integer label for each annular ring air cavity. The label i is an integer i=1 to $i_{max}$ where $i_{max}$ is the total number of air cavity rings. Air cavities noted with lower values of i are closer to the center of focused ultrasonic transducer 30. In a refinement, the plurality of annular rings of air cavities are patterned into Fresnel half-wavelength annular rings for a focal length F. The air cavities are defined by an encapsulating polymer (e.g., Parylene) that is disposed over the top face of piezoelectric substrate 52 or encapsulates the piezoelectric substrate 52, the first metal layer 56, and the second metal layer 58. Examples of encapsulating polymers include, but are not limited to, polyesters (e.g., polyethylene terephthalate, poly (ethylene 2,6-naphthalate)), polycarbonates, polyimides, polyvinyl chloride, polystyrenes, acrylic polymer (e.g., polymethyl methacrylate, polyolefins (e.g., polypropylene), polysiloxanes, polyamides, polyvinylidene fluoride, ethylene-vinyl acetate copolymer, ethylene-vinyl alcohol copolymer, polyvinyl acetate, parylenes (e.g., Parylene C, N, and D), polyureas, polytetrafluoroethylene, epoxy resins, SU-8 (e.g., an epoxy-based photoresist), polydimethylsiloxane, and the like. Parylene C is found to be particularly useful for this encapsulation. In a refinement, the plurality of annular rings of air cavities are patterned into Fresnel half-wavelength annular rings.

Referring to FIG. 2B, a top view of focused ultrasonic transducer 30 is provided. Air cavity ring regions $62^1$, $62^2$, $62^3$, $62^4$, $62^5$ include air cavities $60^1$, $60^2$, $60^3$, $60^4$, $60^5$ encapsulated therein. Also depicted are polymer-covered electrode regions $64^1$, $64^2$, $64^3$, $64^4$, $64^5$, which are regions in which the polymer encapsulant overlaps the metal electrode but does not include encapsulated air cavity rings.

In a variation, focused ultrasonic transducer 30 further includes controller 65 that actuates the electrodes. This controller includes circuitry 66 to apply an actuation voltage between electrodes 56 and 58. During the operation of focused ultrasonic transducer 30, a voltage is applied across the electrodes, piezoelectric substrate 52 sandwiched between the circular regions of the electrodes 56, 58 vibrates in the thickness direction, generating acoustic waves, which are focused through a planar acoustic Fresnel lens on the top electrode. In a refinement, the applied voltage is an AC voltage (e.g., sinusoidal) of 50 to 450 Vpp. In a further refinement, the applied voltage is an AC voltage having a frequency at or near (e.g., within 10 percent) the resonant frequency. The applied voltage can have a frequency from about 1 to 180 MHz). In another refinement, the applied voltage is applied as a voltage pulse of the AC voltage. In a refinement, the voltage pulse can be from about 5 to 10,000 μs.

Figure 2C:
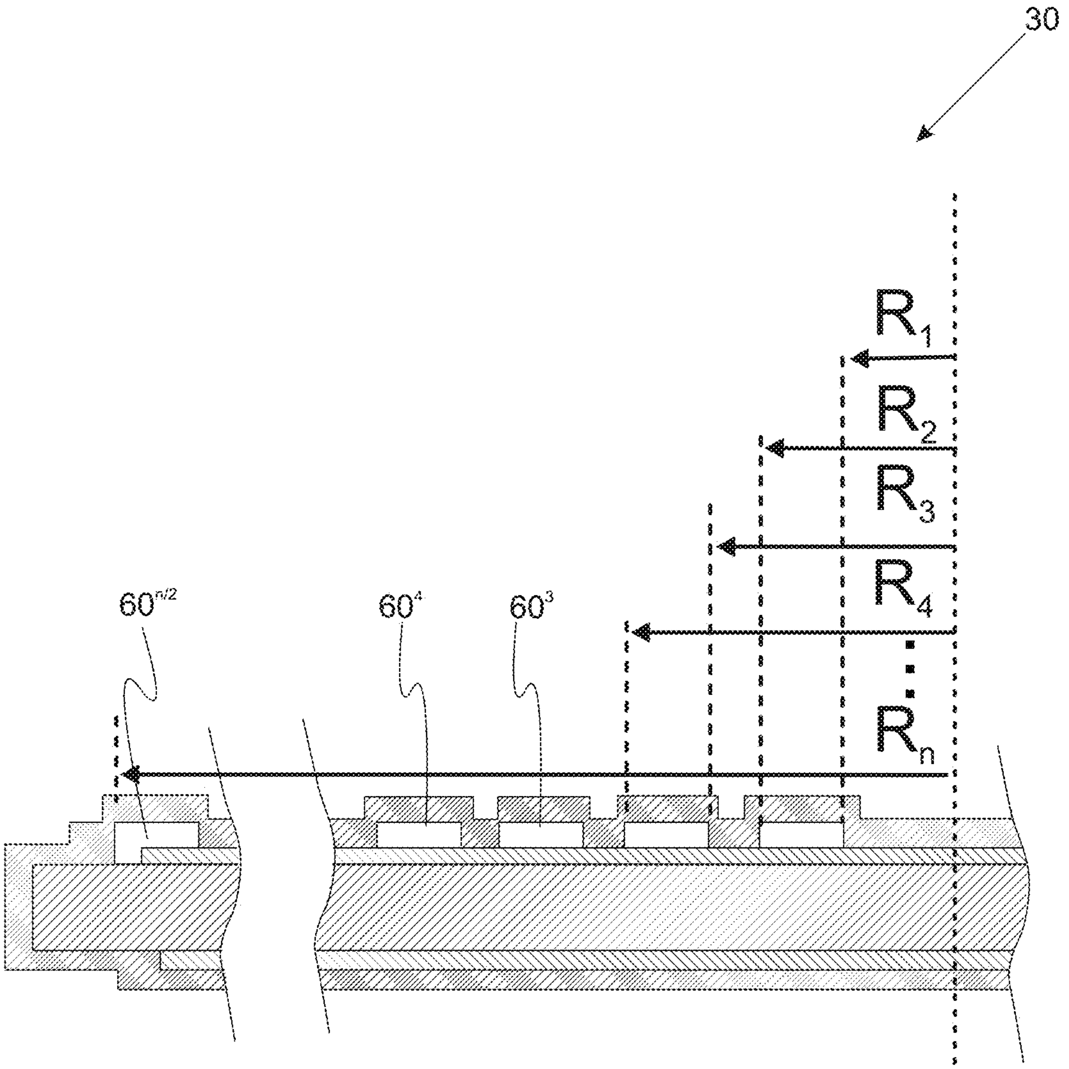
FIG. 2C. Side view of the Self-focusing Acoustic Transducer of FIG. 2A showing the placement of the boundaries for the annular ring air cavities.

Referring to FIG. 2C, to focus ultrasound waves at a focal point at a distance F (focal length) above the center of the transducer's top surface, the annular rings are designed into Fresnel half-wavelength bands (FHWB) [5] so that all the acoustic waves arrive at the focal point with a net phase difference less than 180° after passing through the lens. This is achieved by choosing boundary radii $R_n$ so that the path-length from the focal point to any ring boundary is longer than F by integer multiples of the half-wavelength (λ/2) (see also, FIG. 3A), as shown in the equation below:

$$\sqrt{R_n^2+F^2}-F=n\lambda/2,\ n=0,1,2, \tag{1}$$

from which equation 2 can be derived:

$$R_n=\sqrt{n\lambda\times(F+(n\lambda/4)}),\ n=0,1,2, \tag{2}$$

where λ and F are the wavelength in medium (water) and the designed focal length, respectively. With respect to the label i, boundary radii for an air cavity ring labeled i are $R_{2i-1}$ and $R_{2i}$, i=1, 2, 3 . . . . With respect to the label j, boundary radii for an non-air-cavity labeled j are $R_{2j-2}$ and $R_{2j-1}$, j=1, 2, 3 . . . , which include the circle in the center (which is essentially a "ring" with zero inner diameter) and every other ring outwards.

In another embodiment, a method for contactless, damage-free, high-precision cell and/or particle extraction and transfer using the SFAT-based liquid ejector device described by FIGS. 1A, 1B, 2A, and 2B is provided. The method includes a step of providing a substrate 12 having a first surface and a second surface. The substrate 12 includes cells or particles inside the substrate or on top of the substrate. An acoustic wave is focused on the substrate with a focused ultrasonic transducer 30 such that a droplet that includes at least one cell or particle is ejected from the bulk of the substrate or from the first surface per each actuation of a focused ultrasonic transducer 30 through droplet ejection. Details of ejector device 10 and focused ultrasonic transducer 30 as well as the related operating parameters are the same as set forth above.

Figure 3A:
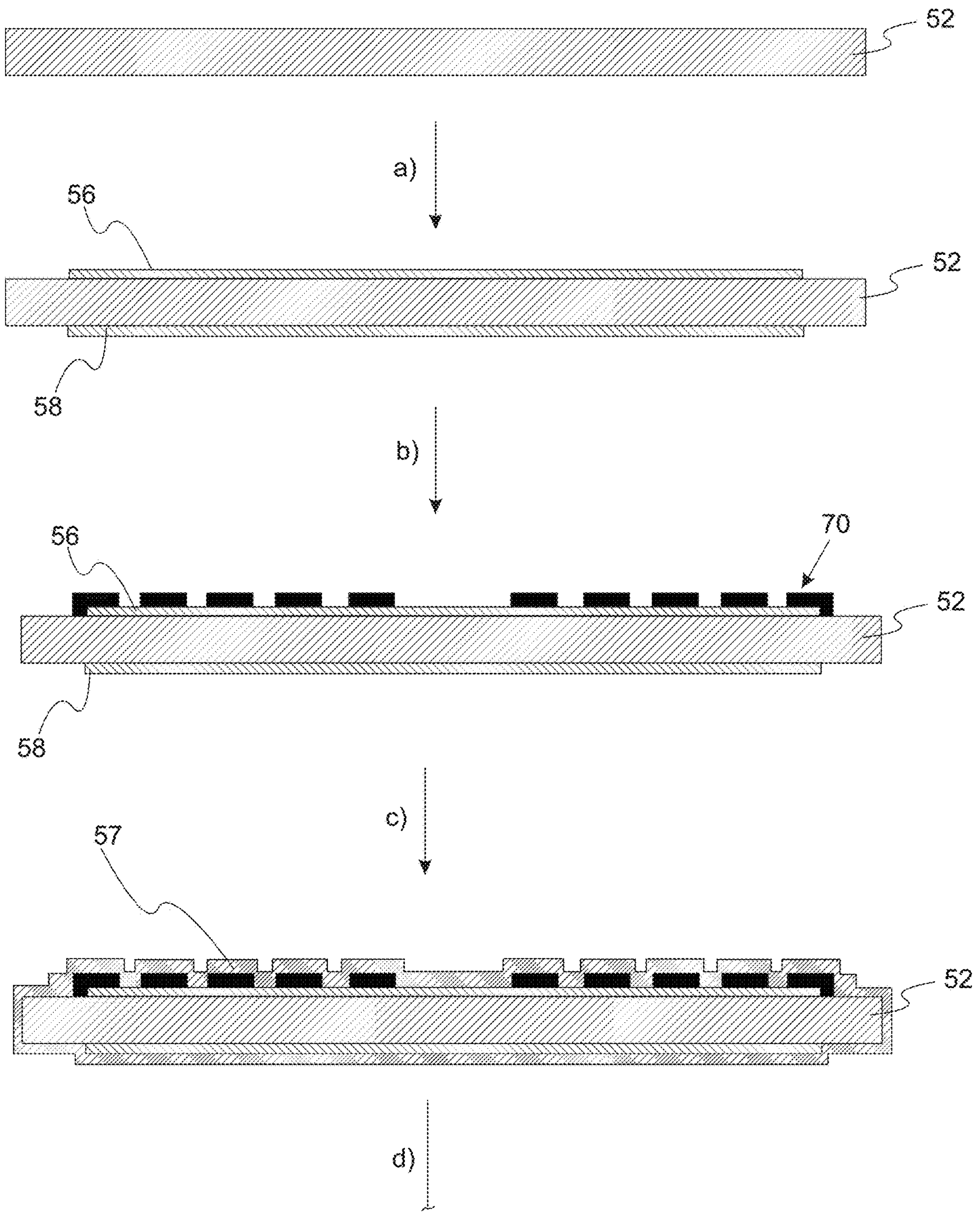
FIGS. 3A and 3B. Schematic flowchart showing the microfabrication of the Self-focusing Acoustic Transducer of FIG. 2A.
Figure 3B:
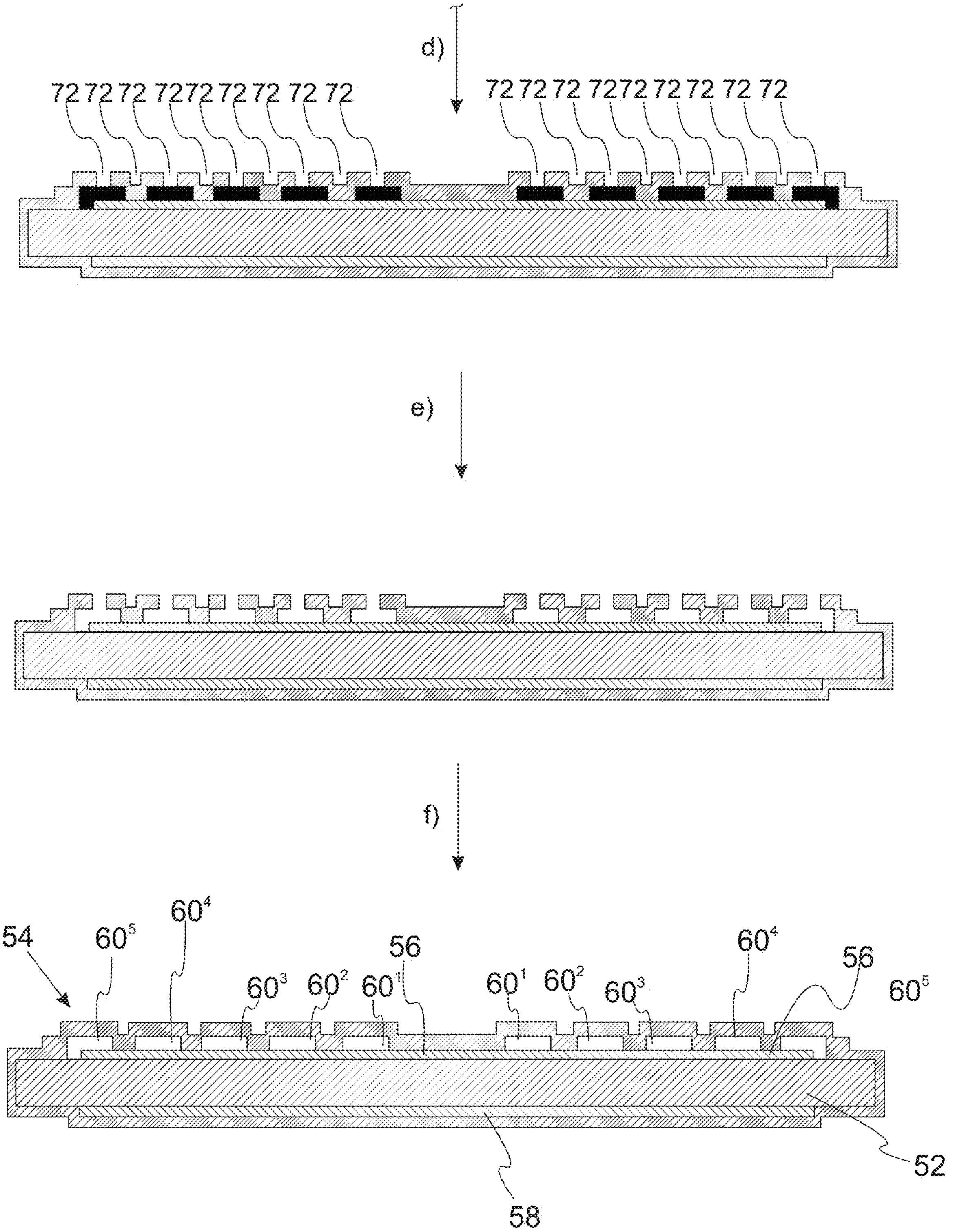

Referring to FIGS. 3A and 3B, a schematic flowchart showing the fabrication of focused ultrasonic transducer 30. In step a, the first patterned metal electrode 56 is deposited over a top face of piezoelectric substrate 52 and a second patterned metal electrode 58 is deposited over a bottom face of piezoelectric substrate 52. In step b), a patterned photoresist layer 70 is deposited (e.g., by spin-coating) and patterned through photolithography over the first metal electrode 56 as a sacrificial layer for air cavity rings. In step c), polymer encapsulant 57 is deposited over the patterned photoresist layer 70 as a structure layer for the air cavities. In a refinement, polymer encapsulant 57 surrounds piezoelectric substrate 52, first patterned metal electrode 56, a second patterned metal electrode 58, and a patterned photoresist layer 70. In step d), release holes 72 are patterned in polymer encapsulant 57. Air cavities are formed through the release holes 72 by surface micromachining in the following steps. In step e), the patterned photoresist layer 70 is removed by introducing a solvent (e.g., acetone into the release holes that can dissolve the photoresist. In step f), another layer of the polymer is deposited to seal the air cavities.

The following examples illustrate the various embodiments of the present invention. Those skilled in the art will recognize many variations that are within the spirit of the present invention and scope of the claims.

I. Device Design

A. Focusing with Fresnel Air-Cavity Lens

Figure 4:
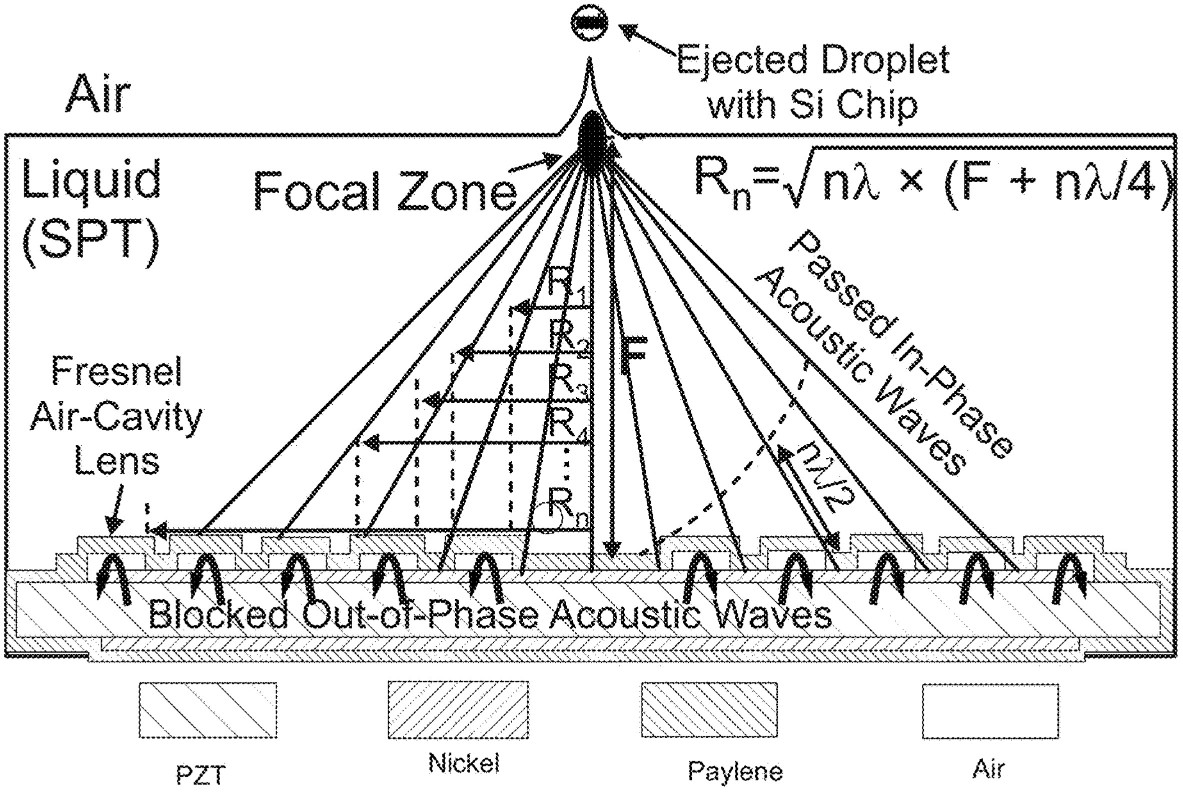
FIG. 4. Cross-sectional schematic diagram of a SFAT-based droplet ejector, showing how the Fresnel annular-ring air-cavity reflector lens works.

The SFATs are built on PZT substrates (FIG. 4), which effectively produce ultrasound when a sinusoidal voltage signal with thickness-mode resonant frequency is applied onto the top and bottom circular electrodes sandwiching the PZT substrate. On the top electrode, a Fresnel acoustic lens including Parylene-sealed annular-ring air cavities alternating with non-air-cavity ring areas on the electrode (with conformal deposition of Parylene) is added. The rings are designed into Fresnel half-wavelength bands (FHWB) for 5 mm focal length, whose boundary radius $R_n$ is given by (2) [5].

This way, the path-length difference from two boundaries of a Fresnel ring band to the focal point (5 mm above transducer center) equals half wavelength. Utilizing acoustic impedance mismatch between air (only 0.4 kRayl) and solid/liquid (over 1 MRayl), all acoustic waves leading to destructive interference (in rings where $R_n<R<R_{n+1}$, n=1, 3, 5, . . . ) will be blocked by air cavities, where constructively interfering acoustic waves (in rings where $R_n<R<R_{n+1}$, n=0, 2, 4, . . . ) can propagate through Parylene layer of the lens (which is used for electrical insulation and acoustic matching), producing focused ultrasound of high intensity to eject droplets from air/water interface.

B. Varied Focal Sizes Through Harmonic Operation

Figures 5A, 5B, 5C, 5D, 5E, 5F:
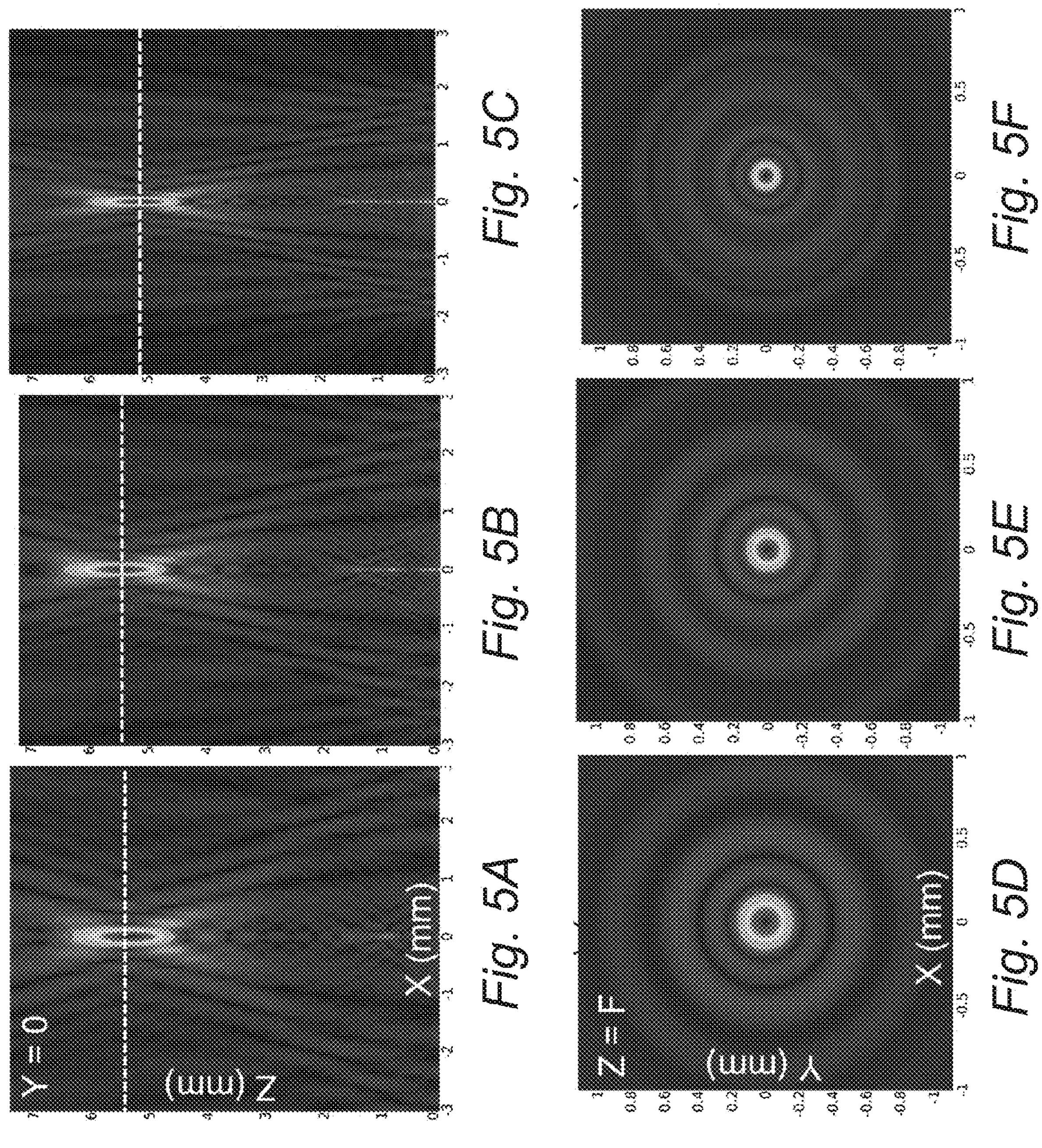
FIGS. 5A, 5B, 5C, 5D, 5E, and 5F. FEM-simulated relative acoustic pressure distribution: on the central vertical planes for SFATs (designed for three different harmonics at 6.60 MHz, 11.00 MHz and 20.96 MHz) working at (A) 6.90 MHz, (B) 11.65 MHz, and (C) 20.99 MHz, respectively; and in the focal planes (dashed lines) for the same SFATs working at (D) 6.90 MHz, (E) 11.65 MHz, and (F) 20.99 MHz.

The focal size of SFAT can be approximated by the width of its outermost ring band (if its boundary radii are much larger than its width) [6], and becomes smaller if the designed operating frequency is higher, as explained in the equation below:

$$\Delta R \cong \sqrt{(cF)/(4Nf)}, \quad (3)$$

where f and c are frequency and sound velocity in medium, respectively. Equation (3) shows that with the same designed focal length and same number of rings, the focal size (which can be estimated by the outermost ring width) will be smaller when the SFAT is working at higher frequency, due to shorter wavelength, which is verified in finite element method (FEM) simulations (FIG. 5). Thus, we designed SFATs with 6 constructive rings working at the 3rd (6.60 MHz), 5th (11.00 MHz), and 9th (20.96 MHz) harmonic thickness-mode resonant frequencies on 1-mm-thick PZT substrates with 5 mm focal length. The actual measured resonant frequencies are 6.90, 11.65 and 20.99 MHz, respectively, which result in focal lengths that are slightly different from the designed values, but have negligible impact on the focusing efficiency. The simulation results are shown in Table I.

TABLE I

SIMULATION RESULTS

| Focusing Parameters | | Working Frequency (MHz) 6.90 | 11.65 | 20.99 |
|---|---|---|---|---|
| Focal Length (mm) | In Water | 5.34 | 5.39 | 5.08 |
| | Through Dish & Gel | 4.59 | 4.69 | 4.38 |
| Focal Size (μm) | In Water | 190.9 | 144.2 | 102.4 |
| | Through Dish & Gel | 198.6 | 149.0 | 103.4 |
| Normalized Peak Pressure | In water | 100% | 100% | 100% |
| | Through Dish & Gel | 73.8% | 88.9% | 88.8% |

C. Focusing Through Agarose-Gel-Filled Petri Dish

When a Petri dish (made of polystyrene with its bottom plate being 0.75 mm thick) containing agarose gel is immersed in water between SFAT and the water's top surface, the acoustic waves produced by the SFAT propagate through the water, Petri dish's bottom substrate, and agarose gel, interfering with each other. The waves constructively interfere at the focal point with slightly larger focal size and slightly attenuated peak pressure at a slightly closer focal point (FIG. 6 and Table I), compared to the case of having no Petri dish. This is due to the fact that acoustic impedances of Petri dish (2.49 MRayl, attenuation coefficient 0.285 dB/cm-MHz [7]) and agarose gel (1.58 MRayl, attenuation coefficient 0.07 dB/cm-MHz [8]) are close to the water's acoustic impedance (1.48 MRayl), so that there is little reflection at the interfaces of different media.

To reduce the acoustic loss from reflections, the thickness of 1% (w/v) agarose gel is optimized through simulation, and a thickness of 0.98 mm is thus chosen so that almost optimal peak pressure can be achieved for all three frequencies. The gel thickness is realized by pouring 7.2 mL melted agarose gel solution into a 90-mm-diameter Petri dish.

II. Experimental Results

A. Pressure Measurement with Hydrophone

Figures 6A, 6B, 6C:
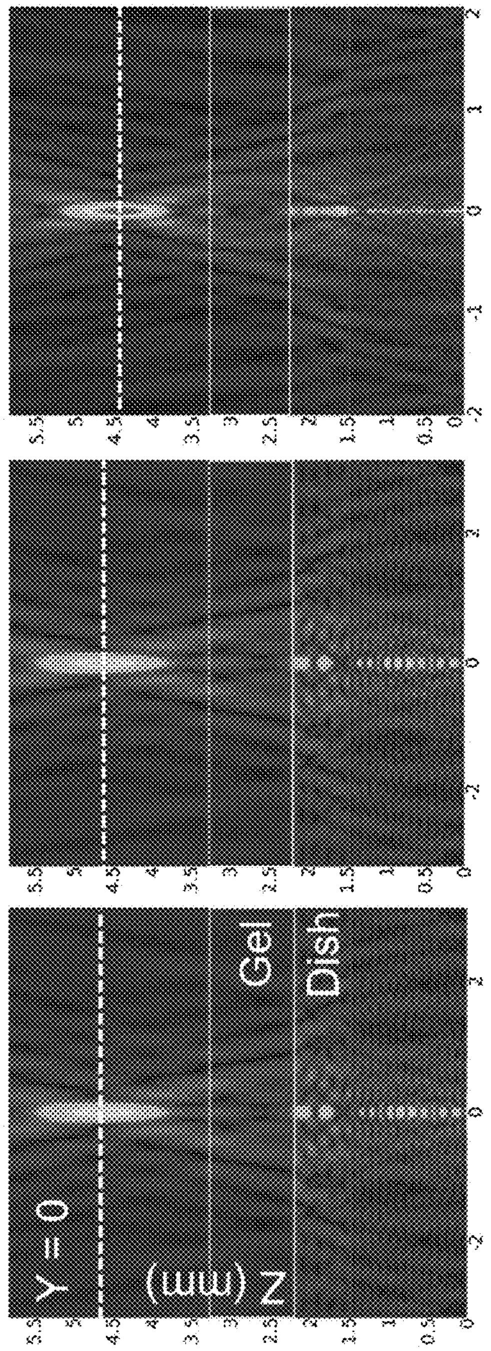
FIGS. 6A, 6B, 6C, 6D, 6E, and 6F. FEM-simulated relative acoustic pressure distribution when the bottom of a Petri dish (with 0.75-mm-thick bottom plate, red line) filled with 0.98-mm-thick 1% agarose gel (yellow lines) is 1.5 mm above SFAT surface in water: on the central vertical plane for SFATs working at (A) 6.90 MHz, (B) 11.65 MHz, and (C) 20.99 MHz, respectively; and in the focal planes (dashed lines) for the same devices working at (D) 6.90 MHz, (E) 11.65 MHz, and (F) 20.99 MHz. The color scale ranges are adjusted to be the same as those in FIG. 5.
Figures 6D, 6E, 6F:
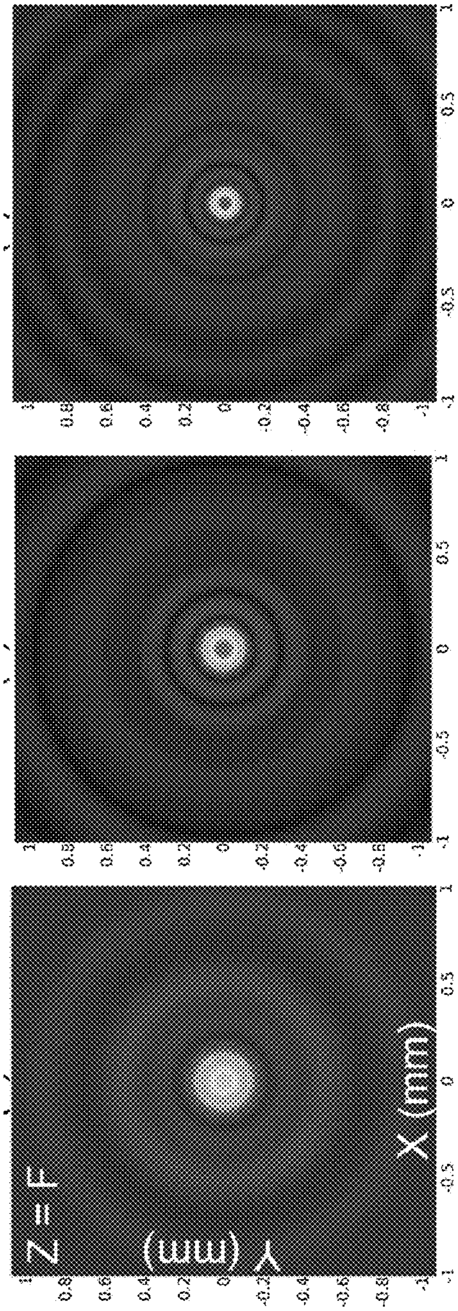
Figure 7A:
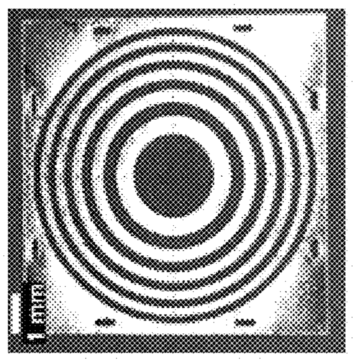
FIGS. 7A, 7B, 7C, 7D, 7E, and 7F. Photos of fabricated devices on PZT substrates working at (A) 6.90 MHz, (B) 11.65 MHz, (C) 20.99 MHz, showing the air-cavities (shiny areas), and the same devices working at (D) 6.90 MHz, (E) 11.65 MHz, (F) 20.99 MHz under a digital microscope, showing air cavities (light grey areas), Parylene-covered electrode (dark grey areas), and sealed release holes.
Figure 7B:
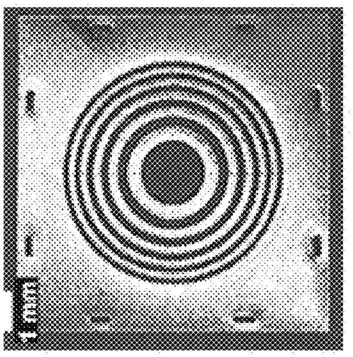
Figure 7C:
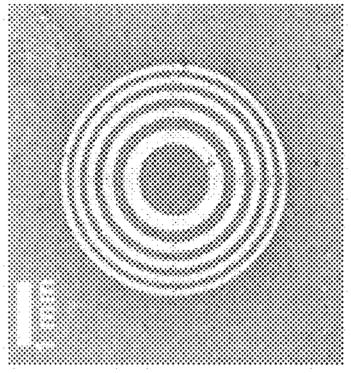
Figure 7D:
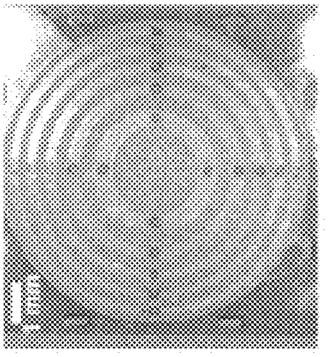
Figure 7E:
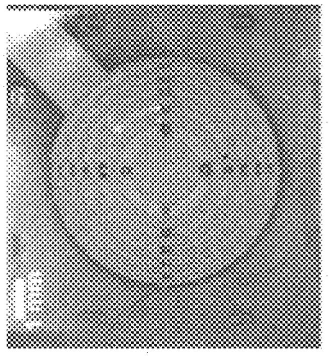
Figure 7F:
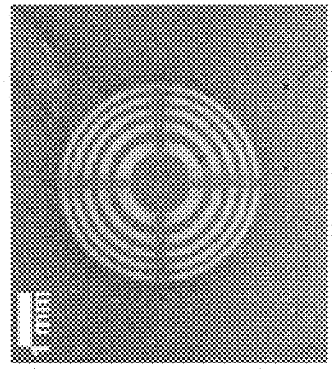
Figure 8:
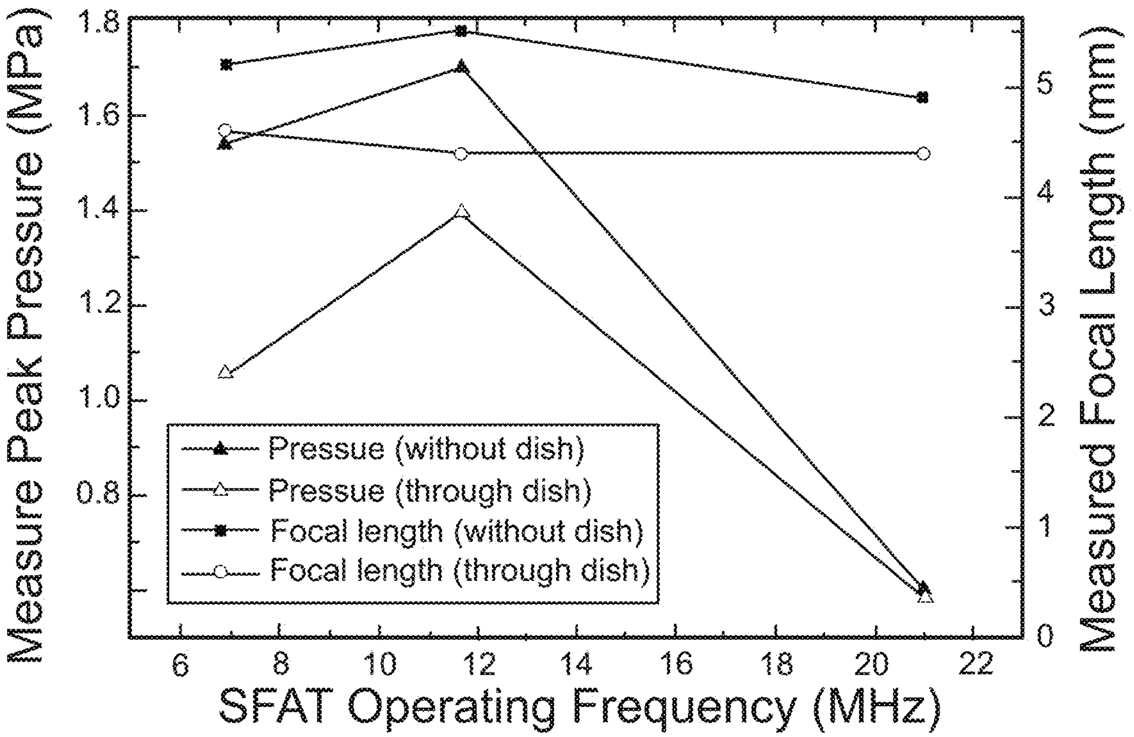
FIG. 8. Measured peak acoustic pressure at the focal point and focal length from different SFATs with and without the agarose-gel-filled Petri dish.

The SFATs are microfabricated according to the steps described in [9], in which the air cavities are fabricated through surface micromachining involving a sacrificial layer made of photoresist. The sacrificial photoresist is dissolved by acetone through release holes on Parylene, which are sealed by another Parylene deposition (FIG. 7D to 7F). To measure the peak acoustic pressure at the focal point, a commercial hydrophone (Onda HGL-0085) fixed onto a manual 3-axis stage is scanned around along the central vertical axis to find the focal point, while the transducer is driven with pulsed sinusoidal signal with 50 $V_{pp}$ at the resonant frequencies of each device. Then the same experiments are repeated with a Petri dish filled with 0.98-mm-thick agarose gel with the bottom of the Petri dish about 1.5 mm above the surfaces of SFATs. From the measurements (FIG. 8), the agarose-gel-filled Petri dish is seen to attenuate the acoustic pressure by 31.9%, 18.4% and 3.6% for the 3rd, 5th, and 9th harmonic SFATs, respectively, and the measured focal lengths are close to the simulated values (FIG. 6 and Table I).

B. Droplet-Assisted Particle Ejection

Figure 9A:
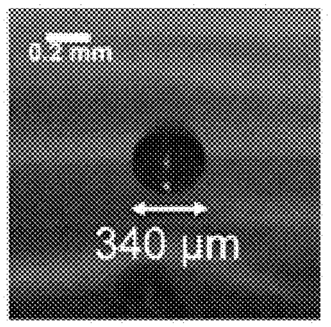
FIGS. 9A, 9B, 9C, 9D, and 9E. Photos showing water droplets ejected through the agarose-gel-filled Petri dish by the SFATs working at (A) 6.90 MHz, (B) 11.65 MHz, and (C) 20.99 MHz. (D) Cross-sectional diagram showing the droplet-assisted particle ejection set-up. (E) Photo of an ejected droplet carrying fluorescent microspheres under black light, ejected from the Petri dish by the 6.90 MHz SFAT and flies above the beaker edge.
Figure 9B:
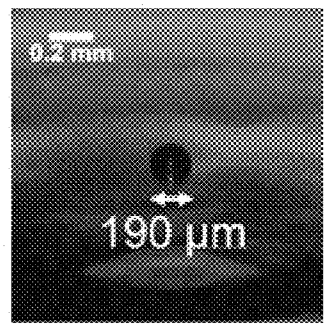
Figure 9C:
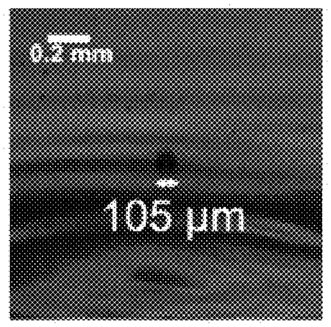
Figure 9D:
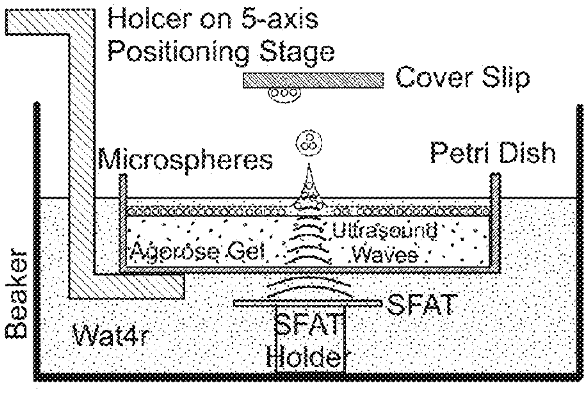
Figure 10A:
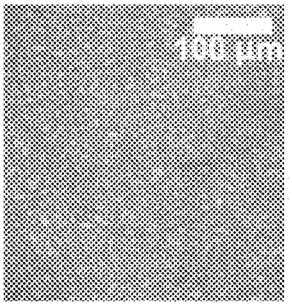
FIGS. 10A, 10B, 10C, 10D, and 10E. Microscope photos of (A) microsphere monolayer on the gel surface; collected microsphere agglomerates on plastic cover slips, ejected by SFATs working at (B) 6.90 MHz, (C) 11.65 MHz, (D) 20.99 MHz, respectively. (E) Diameters of collected microsphere agglomerate on cover slips, ejected droplets without Petri dish and ejected droplets with Petri dish, versus SFAT operating frequency.

A 10-μm-diameter polystyrene microsphere is chosen to simulate grown cells. To embed the microspheres onto agarose gel through self-assembly, a thin layer of water is poured on top of the gel, and fully suspend microspheres in methanol with sonication. Then the methanol with the microspheres is poured into the water layer, and the microspheres form a uniform layer at the water/methanol boundary, most of where a monolayer of microspheres is formed (FIG. 10A). When the solution is almost dried, the microspheres are gently pressed against the gel with a spatula to increase the microspheres' adhesion on the gel. Then the set-up shown in FIG. 9D is used to eject droplets for carrying the microspheres. During ejection experiments, the dish is held by a 5-axis precision manually-movable stage, with a thin layer of water above the gel. The SFAT is placed at the bottom of a beaker filled with water and is driven by pulsed sinusoidal signals of 200 $V_{pp}$ (for the 6.90 MHz and 11.65 MHz transducers) or 400 $V_{pp}$ (for the 20.99 MHz transducer) at the resonant frequency, at a pulse repetition frequency (PRF) of 20 Hz, while the position of the Petri dish is adjusted until ejection can happen. Ejection of a single water droplet per pulse with the agarose-gel-filled Petri dish (FIG. 9A to 9C) was successfully observed. The diameter of ejected droplets and the minimum pulse width needed for ejection to happen are summarized in Table II.

Figure 9E:
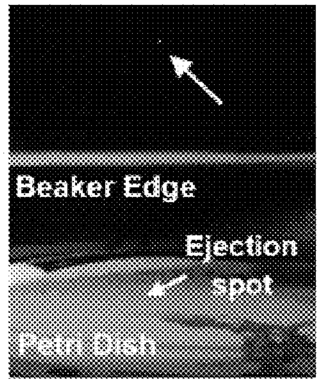
Figure 10B:
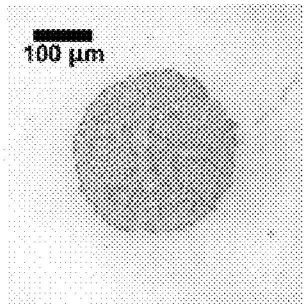
Figure 10C:
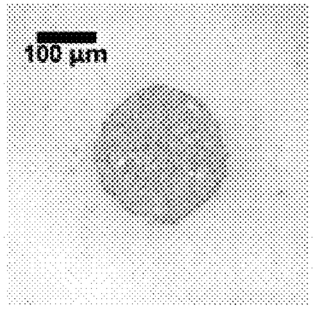
Figure 10D:
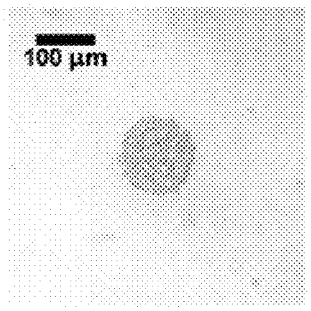
Figure 10E:
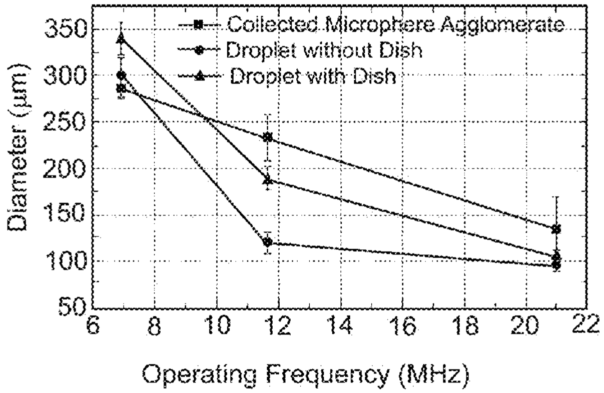

The ejected droplets carrying microspheres (FIG. 9E) are collected with a coverslip held above the water surface (FIG. 10B-10D). All the SFAT-ejected droplets contain microspheres, and the diameter of collected microsphere agglomerates on coverslips (which determines the number of microspheres per droplet) is related to droplet size (FIG. 10E).

TABLE II

Droplet Diameters and Driving Conditions for Ejection Through Petri Dish & Gel

| | Working Frequency (MHz) | | |
|---|---|---|---|
| Ejection Parameters | 6.90 | 11.65 | 20.99 |
| Droplet Diameter (μm) | 340 | 190 | 105 |
| Minimal Pulse Width Needed (μs) | 94.2 | 60.1 | 33.4 |
| Driving Voltage ($V_{pp}$) | 200 | 200 | 400 |

Assuming the collected microspheres are in monolayer with a filling factor of 0.9069, with 6.90 MHz, 11.65 MHz and 20.99 MHz SFATs, the estimated numbers of microspheres per ejected droplet are: 746, 498, and 167, respectively. More and less number of microspheres per droplet could be easily achieved by designing transducers at lower and higher frequencies, respectively. During 10 minutes of operation (2 droplets per second), no temperature rise or visible gel damage is observed.

C. Droplet-Assisted Cell Ejection

Figure 11A:
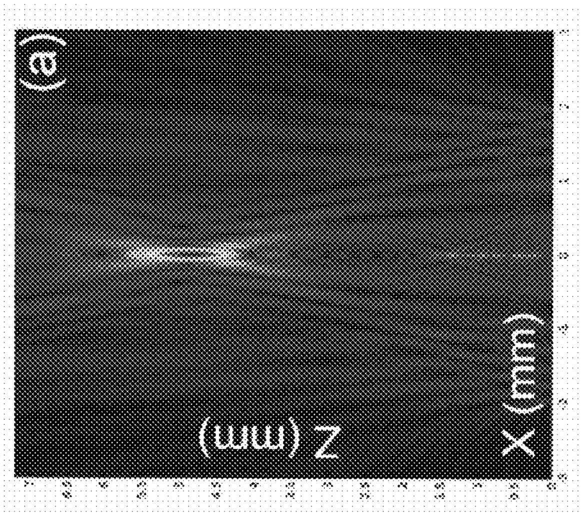
FIGS. 11A, 11B, 11C, 11D, and 11E. (A) Simulated relative acoustic pressure distribution on the central vertical plane above a SFAT working at 20.12 MHz with a Fresnel lens designed for 20.96 MHz and 5-mm focal length. (B) Cross-sectional diagram showing the droplet-assisted cell ejection set-up. Microscope photos of 100% confluency human retinal pigment epithelium (RPE) monolayer cells (C) before and (D) after an ejection of cells by SFAT. (E) Photo of the same monolayer cells when the cells are re-cultured (for 4 days) after the cell ejection.

The ejection of human retinal pigment epithelium (RPE) cells is tested using an SFAT built on a PZT-4 substrate. The resonant frequency is measured to be 20.12 MHz, and the focal length is simulated to be 4.86 mm (FIG. 11A).

Figure 11B:
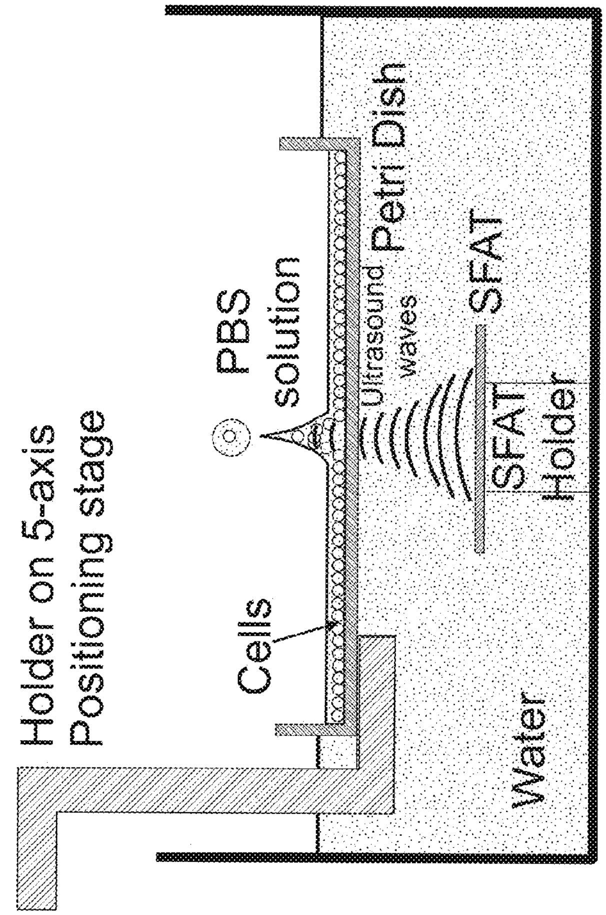
Figure 11C:
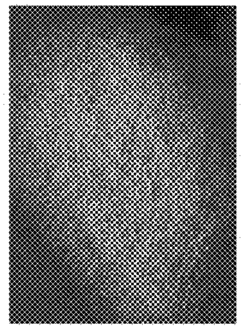
Figure 11D:
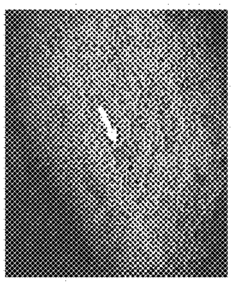
Figure 11E:
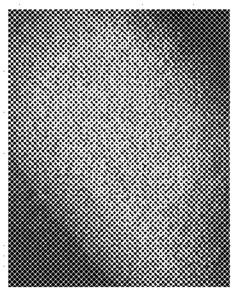

The experiment set-up (FIG. 11B) is similar to that for the particle ejection (FIG. 9D), except that (1) the monolayer of cells is cultured directly on the inner bottom of a Petri dish without any agarose gel (FIG. 11C) and (2) the cells are immersed in a shallow layer (about a few hundreds of micrometers above the cells) of phosphate-buffered saline (PBS) solution to keep the cells alive, while also creating a liquid-air interface close enough to the cells for droplet ejection. Each intended ejection spot is circled with a permanent marker at the outer bottom of the Petri dish, which allows us to visually align the transducer center to the ejection spot. The vertical distance between the SFAT and the Petri dish is first adjusted to about 4.8 mm, and then slowly increased and decreased through scanning the Petri dish up and down around the initial position, while the SFAT is driven with 20.12 MHz pulsed sinusoidal drive of 300 $V_{pp}$, with 248 μs pulse width at 50 Hz PRF, to produce visible droplet ejection. Ejection of cells (FIG. 11D) has been successfully observed from the cell monolayer with the ejection spot diameter being about 100 μm, close to the simulated focal diameter of the SFAT, without any visible damage to the cells surrounding the ejection spot. After four days of re-culturing, the new cells grown out of the remaining cells fill in the empty spot left by the previous ejection (FIG. 11E), without any scar or damage.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

REFERENCES

[1] W. E. Lowry, L. Richter, R. Yachechko, A. D. Pyle, J. Tchieu, R. Sridharan, A. T. Clark, and K. Plath, "Generation of Human Induced Pluripotent Stem Cells from Dermal Fibroblasts," *Proceedings of the National Academy of Sciences, vol.* 105, no. 8, pp. 2883-2888, 2008.

[2] D. Frumkin, A. Wasserstrom, S. Itzkovitz, A. Harmelin, G. Rechavi, and E. Shapiro, "Amplification of Multiple Genomic Loci from Single Cells Isolated by Laser Micro-Dissection of Tissues," *BMC Biotechnology*, vol. 8, no. 1, p. 17, 2008.

[3] Y. Tang, L. Wang, Y. Wang and E. S. Kim, "On-Demand, Heatless Ejection of Sub-Millimeter-Sized Liquid Droplets," *The* 30*th IEEE International Conference on Micro Electro Mechanical Systems* (*MEMS* 2017), Las Vegas, NV, USA, Jan. 22-26, 2017, pp. 1196-1199.

[4] Y. Tang and E. S. Kim, "Electrical Tuning of Focal Size with Single Focused Ultrasonic Transducer," *IEEE International Ultrasonics Symposium* (*IUS* 2018), Kobe, Japan, Oct. 22-25, 2018, pp. 1-4.

[5] K. Yamada, H. Shimizu, "Planar-Structure Focusing Lens for Acoustic Microscope", *Journal of the Acoustical Society of Japan* (*E*), vol. 12, no. 3, pp. 123-129, 1991.

[6] H. H. Barrett and F. A. Horrigan, "Fresnel Zone Plate Imaging of Gamma Rays; Theory," *Applied Optics*, vol. 12, no. 11, p. 2686, 1973.

[7] L. P. Adjadj, G. Storti, and M. Morbidelli, "Ultrasound Attenuation in Polystyrene Latexes," *Langmuir*, vol. 19, no. 9, pp. 3953-3957, 2003.

[8] S. Yang, et al, "High-Intensity Focused Ultrasound Ablation: an in vitro Agarose Gel Model." *International Journal of Clinical and Experimental Medicine*, vol. 10, no. 11, pp. 15302-15308, 2017.

[9] C. Lee, H. Yu, E. S. Kim, "Acoustic Ejector with Novel Lens Employing Air-Reflectors,", *The* 19*th IEEE International Micro Electro Mechanical Systems Conference, Istanbul* (*MEMS* 2006), Turkey, Jan. 22-26, 2006, pp. 170-173.

What is claimed is:

1. A device for contactless, damage-free, high-precision cell and/or particle extraction and transfer through acoustic droplet ejection, the device comprising:

a substrate having a first surface and a second surface, the substrate having cells or particles inside the substrate or on top of the substrate; and a focused ultrasonic transducer positioned to focus an acoustic wave onto the substrate such that a droplet that includes at least one cell or particle is ejected from a bulk of the substrate or from the first surface per each actuation of the focused ultrasonic transducer through droplet ejection, the focused ultrasonic transducer including:

a piezoelectric substrate having a top face and a bottom face;

a Fresnel acoustic lens including a plurality of annular rings of air cavities disposed on the top face; and a first patterned circular electrode disposed over the top face and a second patterned circular electrode disposed over the bottom face, the first patterned circular electrode overlapping the second patterned circular electrode, wherein a layer of liquid is disposed over the first surface to form an air interface through which the droplet is ejected.

2. The device of claim 1 wherein each droplet formed by droplet ejection includes a single cell or a plurality of cells or a single particle or a plurality of particles.

3. The device of claim 1 wherein the plurality of annular rings of air cavities are formed by an encapsulating polymer.

4. The device of claim 3 wherein the encapsulating polymer is Parylene, SU-8, or polydimethylsiloxane.

5. The device of claim 1 wherein the substrate is agarose gel, PBS solution, or a cell culture medium.

6. The device of claim 1 wherein the substrate is positioned in a first container.

7. The device of claim 6 wherein the first container is a Petri dish.

8. The device of claim 6 wherein the first container is positioned within a second container filled with water or another liquid.

9. The device of claim 1 wherein the substrate is positioned directly over the focused ultrasonic transducer.

10. The device of claim 1 further comprising a moveable stage for holding and positioning the substrate.

11. The device of claim 1, wherein the focused ultrasonic transducer is configured to operate at a plurality of different frequencies.

12. The device of claim 1, wherein the focused ultrasonic transducer is configured to operate at a plurality of focal sizes.

13. The device of claim 1 further comprising a collection plate for collecting ejected droplets.

14. The device of claim 13 further comprising a plurality of collection plates for collecting a plurality of ejected droplets either from a single focused ultrasonic transducer or a plurality of focused ultrasonic transducers.

15. The device of claim 13 further comprising a plurality of collecting sites or wells in the collection plate for collecting a plurality of ejected droplets at a plurality of different collecting sites or wells.

16. The device of claim 1, wherein the first patterned circular electrode is disposed over the top face; and the second patterned circular electrode is disposed over the bottom face; and wherein the plurality of annular rings of air cavities is disposed over the first patterned circular electrode, the plurality of annular rings of air cavities being patterned into Fresnel half-wavelength annular rings.

17. The device of claim 1, wherein the piezoelectric substrate comprises lead zirconate titanate.

18. The device of claim 1, wherein the piezoelectric substrate has an ultrasonic fundamental thickness-mode resonant frequency.

19. The device of claim 1, wherein the piezoelectric substrate has a fundamental thickness-mode resonant frequency from about 1 to 180 MHz.

20. A method for contactless, damage-free, high-precision cell and/or particle extraction and transfer, the method comprising:

providing a substrate having a first surface and a second surface, the substrate having cells or particles inside the substrate or on top of the substrate; and focusing an acoustic wave on the substrate with a focused ultrasonic transducer such that a droplet that includes at least one cell or particle is ejected from a bulk of the substrate or from the first surface per each actuation of the focused ultrasonic transducer through droplet ejection, the focused ultrasonic transducer including:

a piezoelectric substrate having a top face and a bottom face;

a Fresnel acoustic lens including a plurality of annular rings of air cavities disposed on the top face; and a first patterned circular electrode disposed over the top face and a second patterned circular electrode disposed over the bottom face, the first patterned circular electrode overlapping the second patterned circular electrode, wherein a layer of liquid is disposed over the first surface to form an air interface through which the droplet is ejected.

21. The method of claim 20 further comprising collecting ejected droplets with a collection plate or a plurality of collection plates.

22. The method of claim 20, wherein the focused ultrasonic transducer is configured to operate at a plurality of different frequencies.

23. The method of claim 20 wherein the focused ultrasonic transducer comprises a focal length from about 0.5 mm to about 40 mm.

24. A device for contactless, damage-free, high-precision cell and/or particle extraction and transfer through acoustic droplet ejection, the device comprising:

a substrate having a first surface and a second surface, the substrate having cells or particles inside the substrate or on top of the substrate; and a plurality of focused ultrasonic transducers is configured to operate at a plurality of operating frequencies and/or at a plurality of focal sizes, each focused ultrasonic transducer positioned to focus an acoustic wave onto the substrate such that a droplet that includes at least one cell or particle is ejected from a bulk of the substrate or from the first surface per each actuation of the focused ultrasonic transducer through droplet ejection, the focused ultrasonic transducer including:

a piezoelectric substrate having a top face and a bottom face;

a Fresnel acoustic lens including a plurality of annular rings of air cavities disposed on the top face; and a first patterned circular electrode disposed over the top face and a second patterned circular electrode disposed over the bottom face, the first patterned circular electrode overlapping the second patterned circular electrode, wherein a layer of liquid is disposed over the first surface to form an air interface through which the droplet is ejected.

* * * * *